E. KOEB & R. P. THOMPSON.
COMBINED MOP HEAD AND WRINGER.
APPLICATION FILED OCT. 7, 1909.
985,180.
Patented Feb. 28, 1911.
6 SHEETS—SHEET 3.
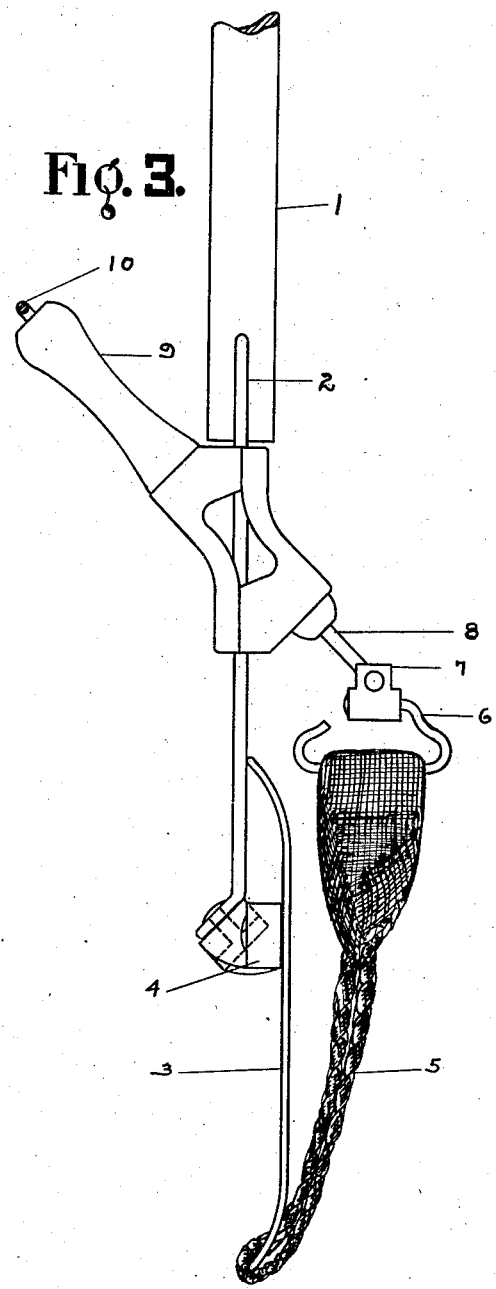
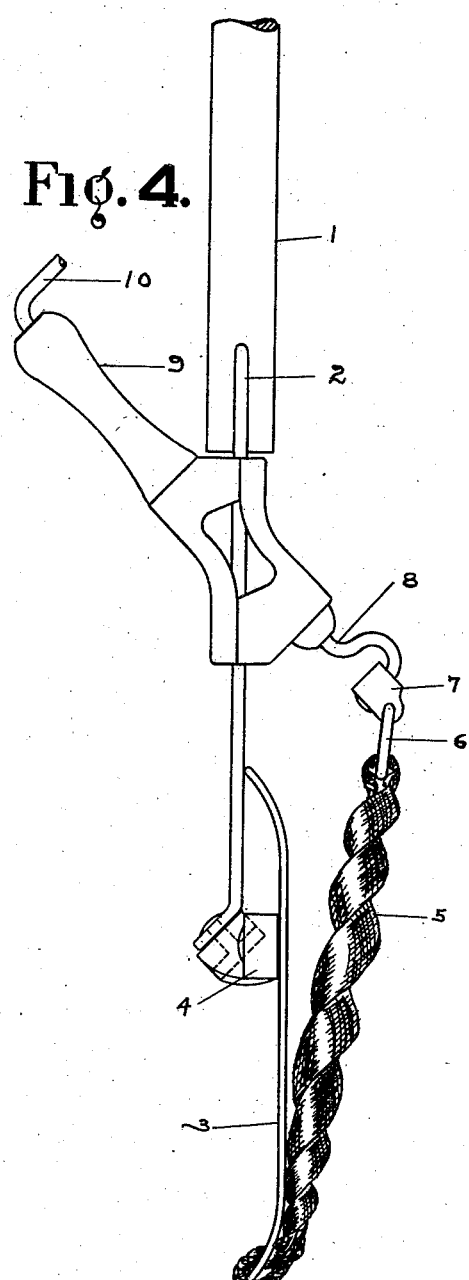
Witnesses
Inventors
Emil Koeb.
Ralph P. Thompson E. KOEB & R. P. THOMPSON.
COMBINED MOP HEAD AND WRINGER.
APPLICATION FILED OCT. 7, 1909.

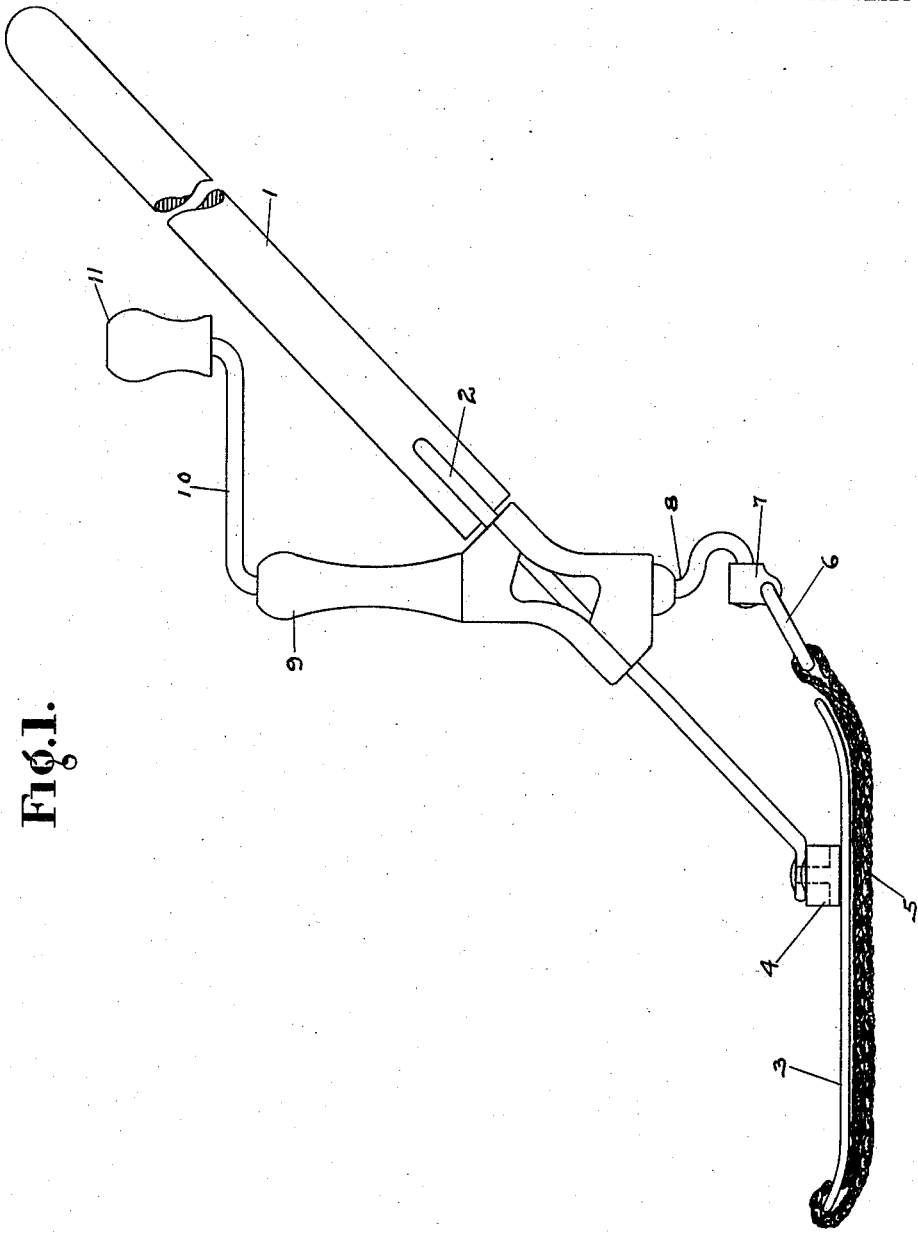

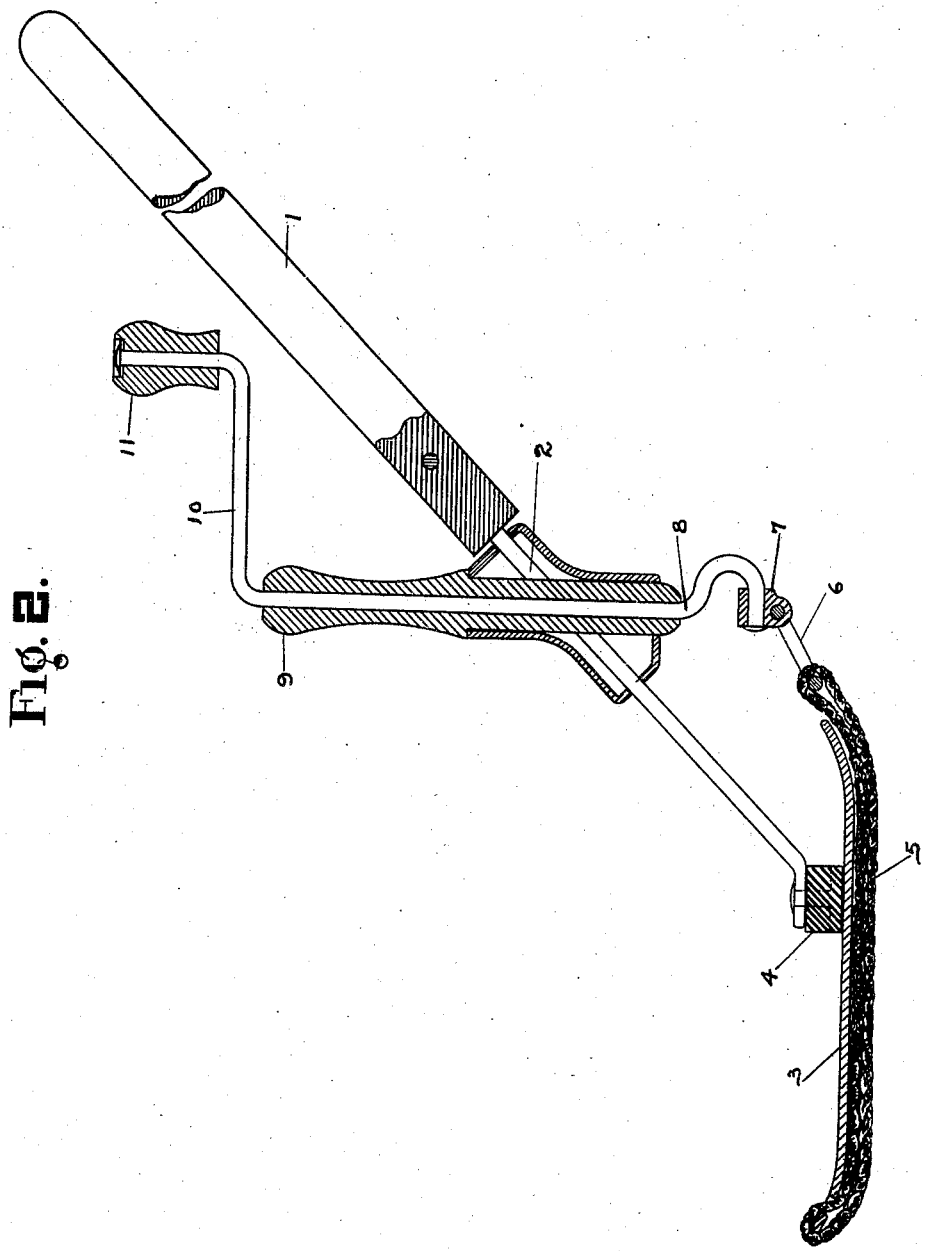

985,180.

Patented Feb. 28, 1911.

6 SHEETS—SHEET 4.

UNITED STATES PATENT OFFICE.

EMIL KOEB AND RALPH P. THOMPSON, OF SPRINGFIELD, OHIO.

COMBINED MOP HEAD AND WRINGER.

985,180.  Specification of Letters Patent.  Patented Feb. 28, 1911.

Application filed October 7, 1909.  Serial No. 521,644.

*To all whom it may concern:*

Be it known that we, EMIL KOEB and RALPH P. THOMPSON, citizens of the United States, residing at Springfield, in the county of Clark and State of Ohio, have invented new and useful Improvements in a Combined Mop Head and Wringer, of which the following is a specification.

Our invention relates to a mop head and wringer, in which a hand operated twisting device is used to wring the mop cloth, thus avoiding the necessity of bringing the hands of the operator in contact with the wet cloth.

The object of our invention is to provide in such a mop and wringer, a wringing device that will require the least possible power to wring the mop cloth, with the further object of arranging the handle and crank so that an easy and natural movement of the operator is all that is required to bring the mop from its position on the floor to the position in which it is held during the act of wringing.

We accomplish our first object by transmitting the movement of the hand crank directly to the wringing of the mop cloth, by means of a single shaft that lies as near as possible in a direct line with the mop cloth when it is undergoing the wringing process, thus avoiding the use of bevel gears or other moving parts that would cause unnecessary friction.

Our second object follows from the fact that by our arrangement of the parts, the natural position for wringing is easily assumed by tucking handle under the right arm, grasping the knob below the crank with the left hand, which leaves the right hand free to turn the crank.

Figure 5:
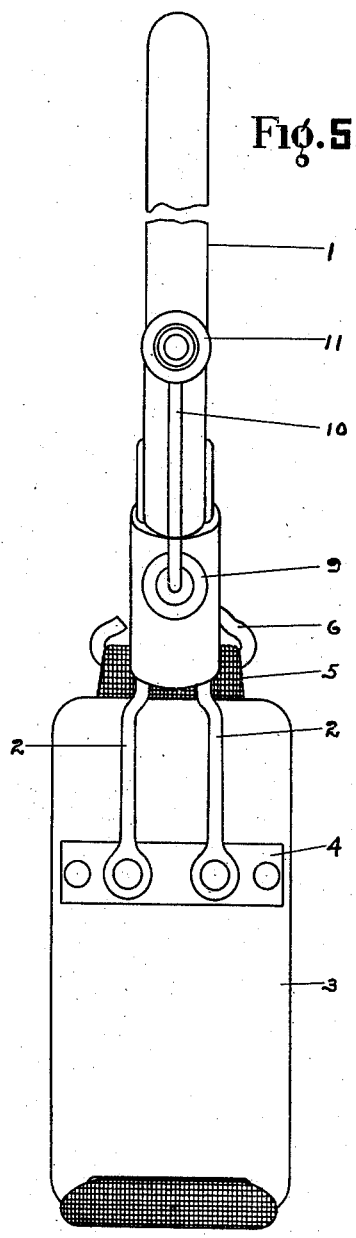
Figure 6:
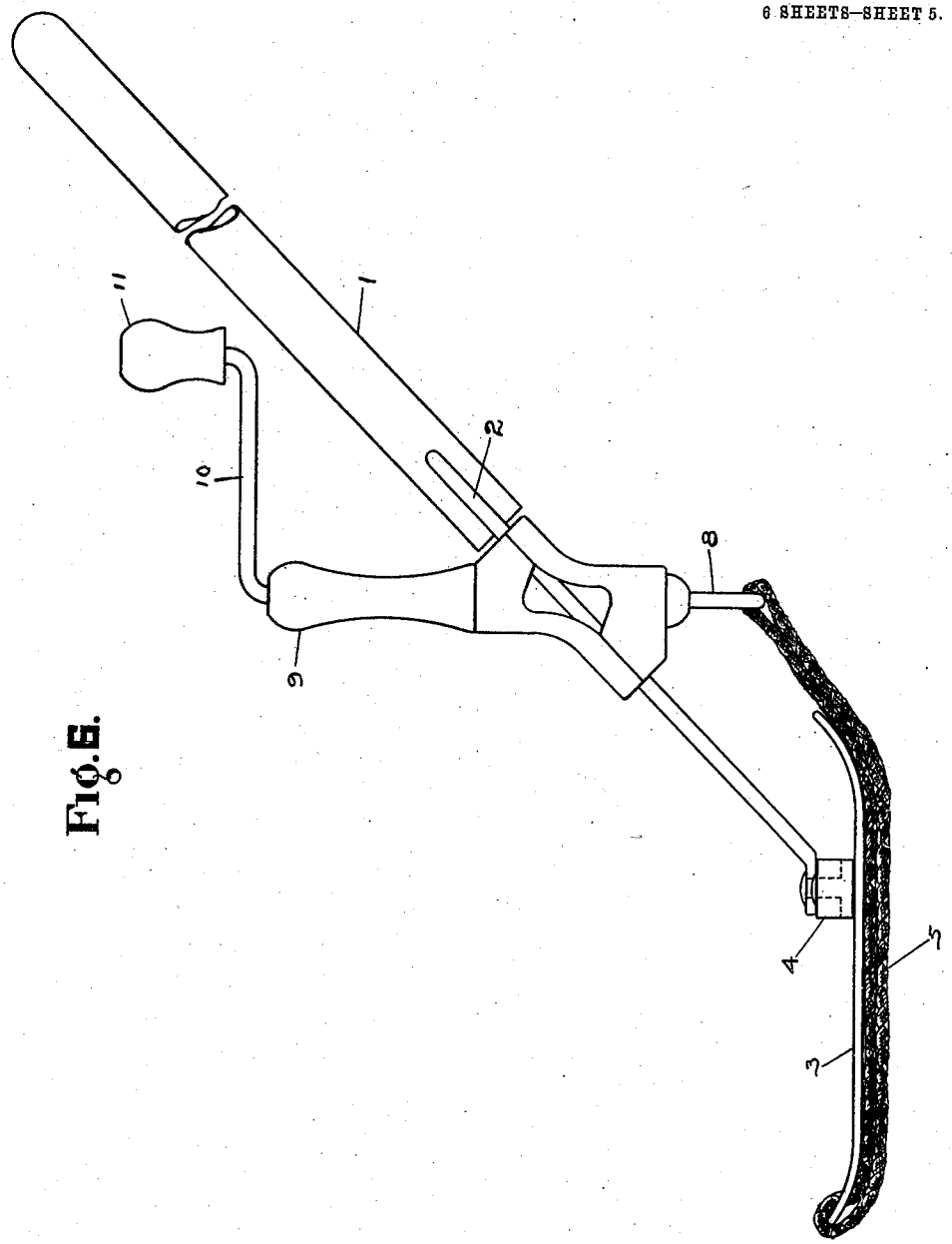
Figure 7:
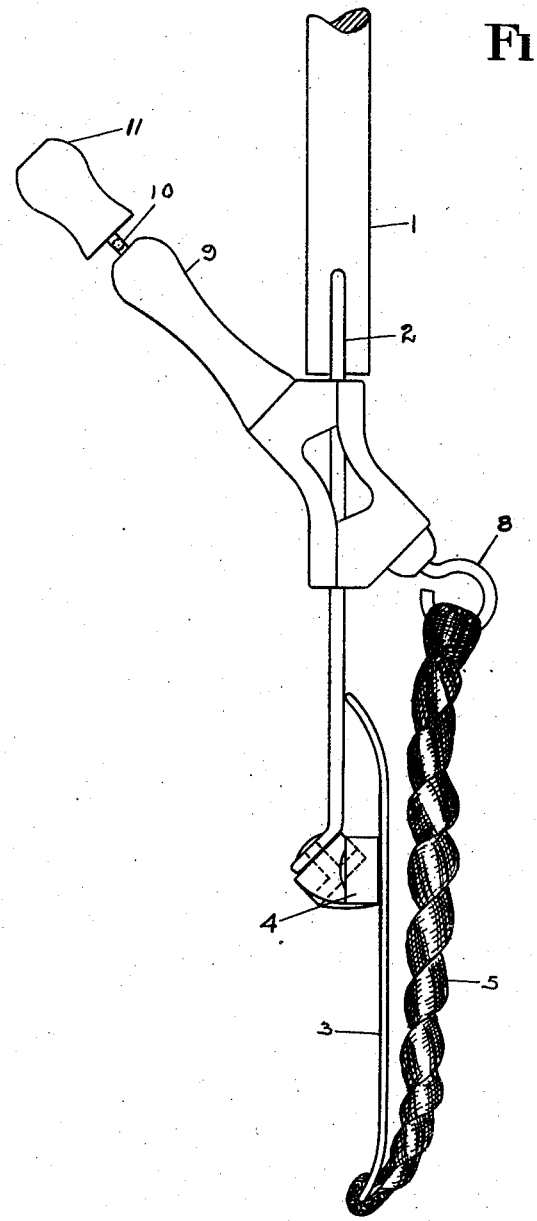

Referring to the drawings which form a part of this specification, and in the different views of which like parts are designated by like characters;—Figure 1 is a side view of the mop in position on the floor. Fig. 2 is a cross section in a vertical plane central of the main handle. Fig. 3 is a side elevation with the crank and handle partially cut away but showing the beginning of the wringing movement. Fig. 4 shows the position and shape of mop cloth at the end of the wringing operation. Fig. 5 is a top view of said mop and wringer. Fig. 6 is a modified form shown in the same position as Fig. 1. Fig. 7 is the same form as Fig. 6, but shown in the position of Fig. 4.

In Fig. 1, 1 is the handle. 2 is a spring extension to the handle formed of wires. 3 is a presser foot which carries the mop cloth on its under side, and keeps the mop cloth properly spread out on the floor. 4 is a block of rubber attached upon its lower side to the top of the presser foot 3, and attached independently upon its upper side to the extension 2. 5 is the mop cloth which is looped through the toe of the presser foot 3, and thence passes beneath the presser foot and is attached to a ring 6, see also Fig. 3. 7 is a block by which the ring 6, is attached to the crank shaft, a short projection of which shows at 8. The shaft 8, passes through the hand grip 9, and is bent into the form of a crank 10, which terminates in the handle 11. The loop 6, swivels in the block 7, and the block 7, swivels upon the bend of the shaft 8, so that together they form a universal connection between the mop cloth and shaft 8. The rubber block 4 yields to the pressure of the mop cloth, as it is twisted, and allows the presser foot to take a position parallel with the extension 2.

Fig. 6 and Fig. 7 show a modified form in which the shaft 8 is bent into a ring at the lower end, and through which the mop cloth is looped, thus doing away with the universal joint shown in the other form. In operation, the mop cloth remains flat underneath the presser foot, and as it is passed over the floor, pressure is brought to bear upon it from the handle 1, through the spring extension 2, and the presser foot 3. The rubber block 4, which is riveted independently to the presser foot 3, and to the extension 2, provides a flexible coupling that takes care of the angularity of the handle 1, in relation to the floor line, and also allows the presser foot to turn back and free the mop cloth, when the wringing operation is performed. In the act of wringing the mop cloth, the handle is placed under the arm, with hand-grip 9, grasped in one hand and brought into a horizontal position. The crank may then be turned by the free hand, which will wring the cloth as shown in Fig. 4.

The minimum amount of manual labor is required to operate this wringer, from the fact that a secure method of holding it firmly is provided for, in the handles 1 and 9, and also which is of greater moment, the twisting device comprises the fewest possible number of movable parts, which are arranged to transmit the power with the least loss by friction.

Having thus described our invention, we desire to secure Letters Patent, in which the claims are as follows:

1. In a mop head and wringer, the combination of a main handle, a presser foot attached to said main handle, a wringing mechanism consisting of a wringer shaft extending across the said main handle and held in bearings upon the main handle, with the axial line of said wringer shaft crossing at, or near, the central line of the main handle, near the lower end thereof, said wringer shaft being provided with a hand operated crank on one side of the main handle, and means for attaching one end of a mop cloth to said wringer shaft, on the opposite side of said main handle, and means upon the presser foot to attach and hold the other end of the mop cloth for the purpose of effecting the wringing of the mop cloth when the wringer shaft is turned by the hand operated crank, substantially as shown and described.

2. In a mop head and wringer therefor, the combination of a main handle and a side projecting wringer handle, a presser foot flexibly attached to the said main handle and adapted to hold the mop cloth in contact with the floor during the operation of mopping, and also adapted to hold the mop cloth in position for the operation of wringing, a crank shaft with bearings upon the main handle, and extending across the said main handle, a crank for said crank shaft on one side of said main handle, and a device on the opposite side of said main handle for attaching said mop cloth to said crank shaft for the purpose of securing the transmission of the crank motion which takes place on one side of the main handle, and converting it into a twisting of the mop cloth, on the opposite side of said main handle, during the operation of wringing, substantially as shown and described.

In witness whereof we have hereunto subscribed our names this 10th day of September, A. D., 1909.

EMIL KOEB.
RALPH P. THOMPSON.

Witnesses:
T. J. McCORMICK,
CHARLES F. BREITUNG.

---

Copies of this patent may be obtained for five cents each, by addressing the "Commissioner of Patents, Washington, D. C."